P. G. H. HALLONGREN.
INTERNAL COMBUSTION ENGINE.
APPLICATION FILED NOV. 24, 1915.
1,277,717.
Patented Sept. 3, 1918.
2 SHEETS—SHEET 2.
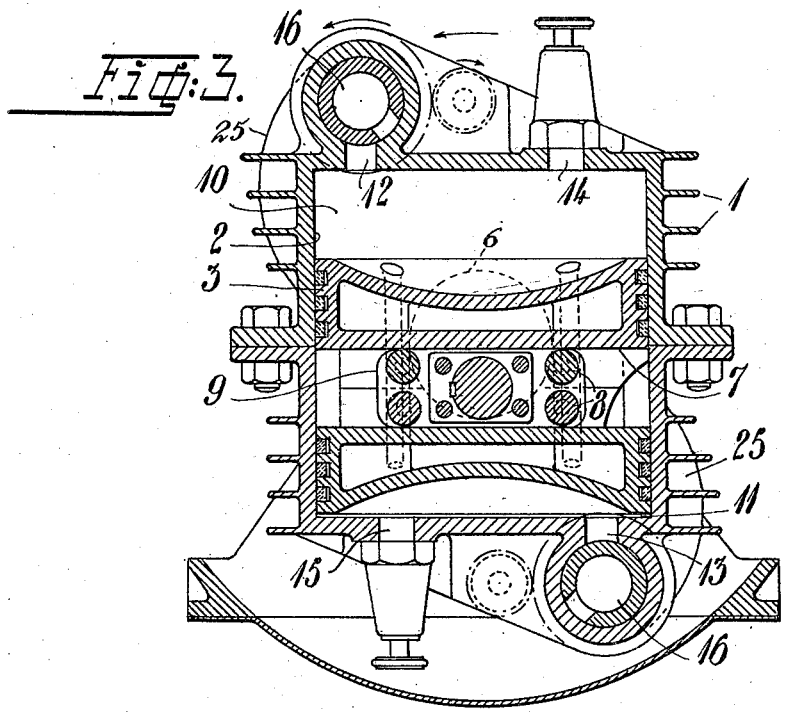
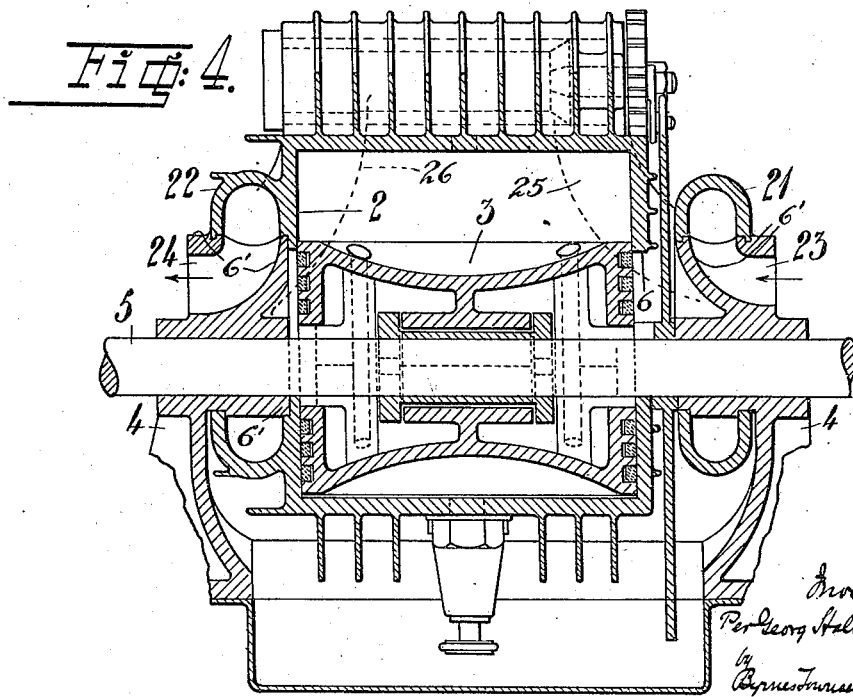

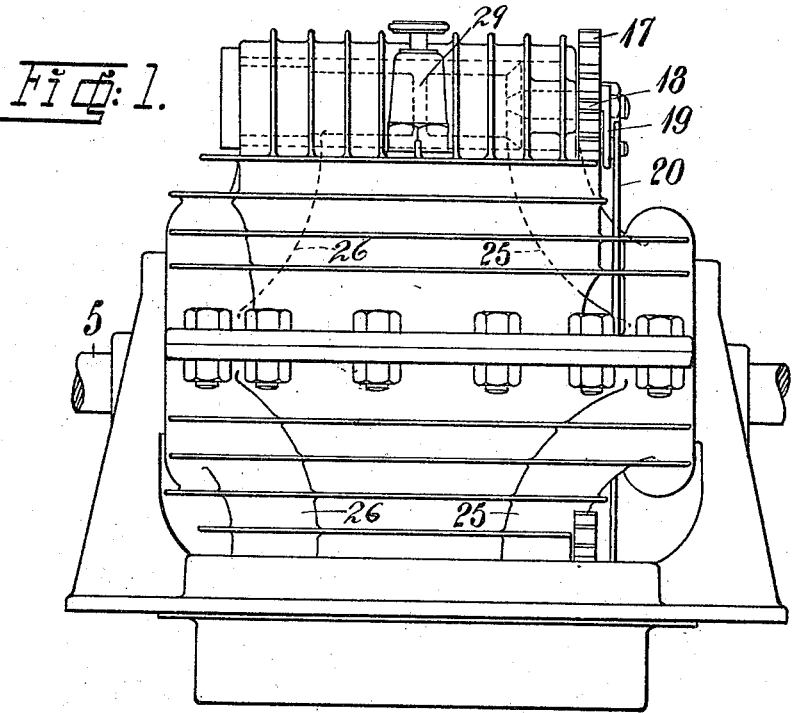
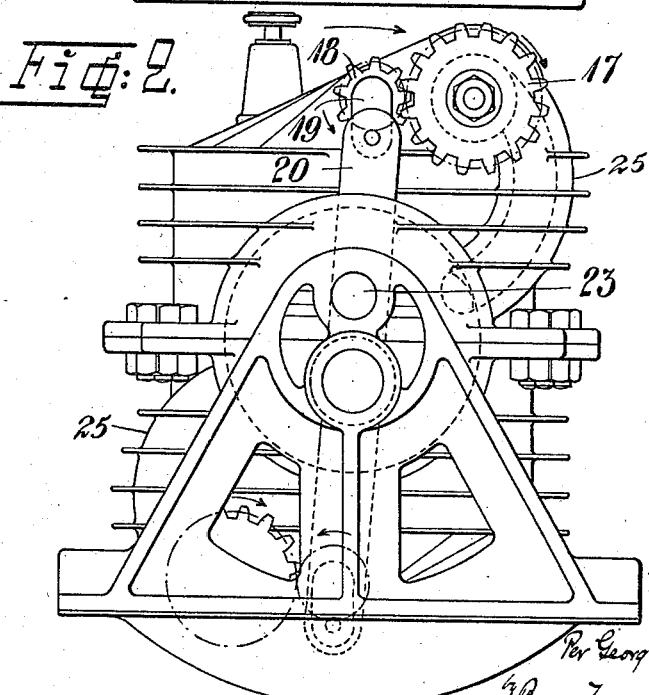

UNITED STATES PATENT OFFICE.

PER GEORG HALVAR HALLONGREN, OF STOCKHOLM, SWEDEN.

INTERNAL-COMBUSTION ENGINE.

1,277,717. Specification of Letters Patent. Patented Sept. 3, 1918.

Application filed November 24, 1915. Serial No. 63,268.

*To all whom it may concern:*

Be it known that I, PER GEORG HALVAR HALLONGREN, a subject of the King of Sweden, and resident of Hagagatan 48, Stockholm, Sweden, have invented certain new and useful Improvements in Internal-Combustion Engines, of which the following is a specification.

The present invention relates to an internal combustion engine with a rotating cylinder, a piston movable in this cylinder and a shaft which passes through the piston and is connected therewith. The principal and characteristic feature of my invention is the rotation of both the cylinder and the shaft and the connection of the shaft to the piston of the cylinder. The chambers of the cylinder on both sides of the piston are in connection with the inlet and exhaust through a rotary valve which is operated from the motor shaft.

For a fuller understanding of my invention reference is had to the accompanying drawings in which—

Figure 1 is a side view of the motor,

Fig. 2 an end view of the same,

Fig. 3 a vertical transverse section, and

Fig. 4 a longitudinal section through the motor.

In a cylinder 2, in the usual manner provided with cooling ribs 1, is a piston 3. A shaft 5, journaled in bearings 4 passes through the cylinder at right angles to the axis thereof and through two openings 6 in the cylinder walls. The bearings 4 are enlarged to form cylindrical bearing portions 6' for the cylinder. These cylindrical bearing portions are eccentrically related to the shaft 5, so that the cylinder has an eccentric movement about shaft 5 when it is revolved on its bearings 6'.

The piston 3 is hollow and is provided with two internal guide surfaces 7 extending transversely of the shaft so as to provide for relative motion between the piston and the shaft. To rigidly connect the piston to the shaft for rotation of the former with the latter, I have keyed to the shaft a carriage 9 and the carriage is provided with rollers 8. These rollers bear on the surfaces 7 and thus reduce the friction between the shaft and the piston during their relative transverse motion to a minimum, while this preferred form of connection insures a rigid connection for rotation of the piston with the shaft.

The piston 3 divides the cylinder in two combustion chambers 10 and 11, each being provided with an inlet indicated by the numerals 12 and 13, respectively, and an igniter indicated by the numerals 14 and 15. Each of the inlets for the fuel mixture is regulated by a rotary valve 16 which is operated from the shaft 5 through a lever 20 pivoted on the shaft, a gear 18 pivoted on the cylinder and connected with the lever through a crank arm 19 and a 2:1 reduction gear connected to the valve and engaging the gear 18. It is thus obvious that the valve will be rotated once while the cylinder makes two complete revolutions.

For the supply of the fuel and the exhaust of the products of combustion the following arrangement is provided: At opposite sides of the cylinder and integral therewith are provided hollow rings or flanges 21 and 22 respectively. These rings are fit to turn on bearing 6' and form with the bearing a duct for the fuel and exhaust gases respectively. In the drawing the opening 23 is shown as the inlet for the fuel which is conducted to the valves and admission ports by channels 25. Similarly the products of combustion are forced out through the exhaust ports and valves to the exhaust opening 24 by channels 26.

Each valve is divided by a partition 29 in two parts, the one to be connected with an admission duct 25 and the other with an exhaust duct 26.

The operation is as follows: When the parts are in the position shown in Fig. 3, a suction of the fuel in the combustion chamber 10 has just taken place, while in the chamber 11 the gas has been compressed and is brought to explosion. The cylinder is thereby revolved and the exploded gas will expand and occupy the full available space between the piston and the cylinder head when the chamber 11 is uppermost, looking at Fig. 3. In the meantime the gaseous mixture in chamber 10 has been fully compressed and is in turn brought to explosion and another impulse is given to the cylinder. When chamber 11 reaches bottom position the products of combustion have been forced out through the exhaust valve belonging to that chamber and the gases have fully expanded in the meantime in chamber 10. As chamber 11 returns to the upper position, the fuel has been sucked in through the admisson valve belonging to it and chamber 10, which has reached bottom position, is exhausted. As chamber 11 reaches bottom position again the gas is compressed again and ignited. During one complete cycle of operations the cylinder makes therefore two revolutions.

It is obvious that the movement of the cylinder about the shaft is eccentric and that the eccentricity causes the lever 20 on the shaft 5 to rotate cranks 19 and these in turn, through gears 18 and 17, to revolve valves 16 once during a complete cycle. It is thus seen that no reciprocating parts are used outside the use of the motor and therefore the velocity of the motor can be great and the motor may be small for a greater capacity.

It is obvious that the shaft as well as the cylinder will rotate in such manner that the center line of the cylinder will move in a plane perpendicular to the shaft.

It is to be noted that instead of one cylinder, two cylinders can be provided. In such a case both pistons must be united with each other to form a single integral structure.

It is also to be noted that a plurality of units may be operated from a single shaft.

I claim:

1. A rotary engine comprising, in combination a supporting frame, cylindrical bearing members on said frame, a cylinder revolubly mounted on said cylindrical bearing members, a straight shaft revolubly mounted in said bearing members, but in eccentric relation thereto and extending through the cylinder, a piston in said cylinder pierced by the shaft, means on the shaft and piston for causing the piston and cylinder to rotate with the shaft, means for admitting of relative transverse motion of the shaft and piston when the cylinder is revolved and means for periodically admitting gas to and exhausting the products of combustion from the cylinder.

2. A rotary engine comprising, in combination, a supporting frame, cylindrical bearing members on said frame, a cylinder revolubly mounted on said bearings, means on the cylinder and the bearings for conducting gas to and the products of combustion away from the cylinder, a straight shaft extending through the cylinder and the cylindrical bearings, but in eccentric relation to the latter, a piston in the cylinder pierced by the shaft, means on the shaft and piston for causing the piston and cylinder to rotate with the shaft, means for admitting of relative transverse motion of the shaft and piston and means for establishing a periodical communication between the cylinder and said conducting means.

3. A rotary engine comprising, in combination, a supporting frame, cylindrical bearing members on said frame in spaced relation, a cylinder revolubly mounted on said bearing members, a shaft extending through the cylinder and the cylindrical bearing members in eccentric relation to the latter, a piston in the cylinder having a hollow space transversely of the shaft, guide elements projecting toward the shaft transversely thereof and presenting parallel surfaces, a carriage rigidly held on the shaft and adapted to glide on and between said parallel surfaces when the cylinder is revolved on its bearings and means for periodically admitting the fuel to and exhausting the products of combustion from said cylinder.

4. A rotary engine comprising in combination, a supporting frame, cylindrical bearing members on said frame in spaced relation, a cylinder revolubly mounted on said bearing members, a shaft extending through the cylinder and the cylindrical bearing members in eccentric relation to the latter, a piston in the cylinder having a hollow space transversely of the shaft, guide elements projecting toward the shaft transversely thereof and presenting parallel surfaces, a carriage keyed to the shaft, rollers in the carriage adapted to travel along the parallel surfaces when the cylinder is revolved on its bearings and means for periodically admitting the fuel to and exhausting the products of combustion from said cylinder.

5. A rotary engine comprising, in combination, a supporting frame, cylindrical bearing members on said frame in spaced relation, a cylinder revolubly mounted on said bearing members, a shaft extending through the cylinder and the cylindrical bearing members in eccentric relation to the latter, a piston in the cylinder, means on the shaft and the piston for causing the piston to rotate with the shaft, means for admitting of relative motion of the piston and the shaft when the latter is revolved, a hollow element on each side of the cylinder adapted to cooperate with the cylindrical bearing members to form an inlet and outlet respectively, admission and exhaust ports at both ends of the cylinder, ducts leading from the said inlet and outlet to said admission and exhaust ports respectively and means responsive to the change of the relative positions of the shaft and cylinder for admitting the fuel to and exhausting the products of combustion from said ports.

6. A rotary engine comprising, in combination, a supporting frame, cylindrical bearing members on said frame in spaced relation, a cylinder revolubly mounted on said bearing members, a shaft extending through the cylinder and the cylindrical bearing members in eccentric relation to the latter, a piston in the cylinder, means on the shaft and the piston for causing the piston to rotate with the shaft, means for admitting of relative motion of the piston and the shaft when the latter is revolved, a hollow element on each side of the cylinder adapted to coöperate with the cylindrical bearing members to form an inlet and outlet respectively, admission and exhaust ports at both ends of the cylinder, ducts leading from the said inlet and outlet to said admission and exhaust ports respectively, valves for periodically opening and closing said ports, gearing connected to said valves, and a lever pivoted on the shaft and connected to the gearing for operating the valves when the cylinder is revolved.

7. A rotary engine comprising, in combination, a supporting frame, cylindrical bearing members on said frame in spaced relation, a cylinder revolubly mounted on said bearing members, a shaft extending through the cylinder and the cylindrical bearing members in eccentric relation to the latter, a piston in the cylinder, means on the shaft and the piston for causing the piston to rotate with the shaft, means for admitting of relative motion of the piston and the shaft when the latter is revolved, a hollow element on each side of the cylinder adapted to coöperate with the cylindrical bearing members to form an inlet and outlet respectively, admission and exhaust ports at both ends of the cylinder, ducts leading from the said inlet and outlet to said admission and exhaust ports respectively, rotary valves for opening and closing each of said ports once during two revolutions of the cylinder, a shaft extending from each valve, a gear on each shaft, a 2:1 reduction gear pivoted on the cylinder to engage said first gear and a lever pivoted on the shaft and connected to the reduction gear to continuously rotate the valves as the cylinder is revolved.

In testimony whereof I have signed my name to this specification in the presence of two subscribing witnesses.

PER GEORG HALVAR HALLONGREN.

Witnesses:
JOHAN MARKMAN,
FRANK J. LYON.

Copies of this patent may be obtained for five cents each, by addressing the "Commissioner of Patents, Washington, D. C."